United States Patent [19]
Edgar

[11] Patent Number: 5,930,770
[45] Date of Patent: Jul. 27, 1999

[54] PORTABLE COMPUTER AND PRINTER FOR TRACKING INVENTORY

[76] Inventor: Steve Edgar, Rte. 1 Box A-1, Dafter, Mich. 49724

[21] Appl. No.: 08/759,047

[22] Filed: Dec. 2, 1996

[51] Int. Cl.$^6$ .............................. G06F 15/21; G06F 1/00; G06F 15/24
[52] U.S. Cl. ................................ 705/28; 705/29; 705/22; 705/26; 705/28; 705/20; 705/30; 235/462.43; 345/348
[58] Field of Search ................................................ 705/28

[56] References Cited

U.S. PATENT DOCUMENTS

| | | | |
|---|---|---|---|
| 5,262,940 | 11/1993 | Sussman | 705/28 |
| 5,319,544 | 6/1994 | Schmerer et al. | 705/28 |
| 5,334,822 | 8/1994 | Sanford | 705/28 |
| 5,380,994 | 1/1995 | Ray | 235/472 |
| 5,404,442 | 4/1995 | Foster et al. | 707/539 X |
| 5,515,303 | 5/1996 | Cargin, Jr. et al. | 235/375 X |

*Primary Examiner*—Allen R. MacDonald
*Assistant Examiner*—Pedro R. Kanof
*Attorney, Agent, or Firm*—Michael I. Kroll

[57] ABSTRACT

The present invention relates to an inventory control system (10) comprising: a portable computer (12) having a portable computer stylus (12E) which has at least one portable computer stylus button (12EB). A portable printer (14) is electrically connected to the portable computer CPU (12A). A computer software (16) is contained within the portable computer (12). The computer software (16) comprises computer software inventory (16A) having computer software inventory items. The computer software (16) further comprises a separate computer software check box (16B) corresponding to each computer software inventory item. The computer software check box (16B) is positioned adjacent to and correlating with each computer software inventory item. The computer software (16) further comprises a separate computer software quantity (16C) corresponding to each computer software inventory item. The computer software quantity (16C) is positioned adjacent to and correlating with each computer software inventory item. The computer software (16) further comprises a separate computer software damage (16D) corresponding to each computer software inventory item. The computer software (16) further comprises a computer software disclaimer (16E) which comprises a computer software pick up disclaimer (16EA) having a computer software pick up disclaimer signature line (16EAA) and a computer software pick up disclaimer computer generated date (16EAB). The computer software disclaimer (16E) further comprises a computer software deliver disclaimer (16EB) having a computer software deliver disclaimer signature line (16EBA) and a computer software deliver disclaimer computer generated date (16EBB), The computer software (16) further comprises a computer software control (16F) which comprises computer software ON/OFF control (16FG) and a computer software print control (16FH).

3 Claims, 4 Drawing Sheets

PORTABLE COMPUTER AND PRINTER FOR TRACKING INVENTORY

BACKGROUND OF THE INVENTION

1. Field of the Invention:

The present invention relates to an inventory control system. More particularly, the present invention relates to an inventory control system which is used primarily in the moving and trucking industry.

2. Description of the Prior Art:

The moving and trucking industry requires both an initial inventory, upon pick up, which includes quantity, description of each item and the condition of each item. In addition, after delivery to a specific location, a secondary inventory which includes quantity, description of each item and the condition of each item must be performed. Presently, this is tedious and done manually utilizing pen or pencil and paper. Therefore, there exists a need for an electronic inventory system which requires a minimal learning curve and is user friendly.

Numerous innovations for inventory systems have been provided in the prior art that are described as follows. Even though these innovations may be suitable for the specific individual purposes to which they address, they differ from the present invention as hereinafter contrasted.

In U.S. Pat. No. 4,972,318, titled, ORDER ENTRY AND INVENTORY CONTROL METHOD, by inventor, Brown et al., a method of order entry, product selection and inventory control for building products, building accessories and building product components is described. In U.S. Pat. No. 5,319,544, titled COMPUTERIZE INVENTORY MONITORING AND VERIFICATION SYSTEM AND METHOD, by inventor Schmerer et al., a system and method for monitoring and verifying inventory is provided which comprises a portable computer with a printer and a modem "cabled" together and maintained in a carrying case. In U.S. Pat. No. 5,380,994, titled MICROCOMPUTER ADAPTED FOR INVENTORY CONTROL, by inventor Ray, a portable microcomputer inventory system including a plurality of components and a support for supporting the components on an user as the user inventories items that have a bar code thereon. In U.S. Pat. No. 5,404,442, titled VISIBLE CLIPBOARD FOR GRAPHICAL COMPUTER ENVIRONMENTS, by inventor Foster et al., a text, graphic or other selected objects of a computer screen are selected and converted into a "visual clipboard" which is attached to a convenient boundary of the screen.

The above described patented inventions differ from the present invention because the patented inventions lack one or more of the following features: a portable computer having a portable computer display, a portable computer power means, a portable computer stylus, a portable computer housing stylus holder, and computer software having a computer software inventory therein.

Numerous innovations for inventory control systems have been provided in the prior art that are adapted to be used. Even though these innovations may be suitable for the specific individual purposes to which they address, they would not be suitable for the purposes of the present invention as heretofore described.

SUMMARY OF THE INVENTION

The present invention relates to an inventory control system. More particularly, the present invention relates to inventory control system which is used primarily in the moving and trucking industry.

The types of problems encountered in the prior art are present day inventory control systems are tedious, not user friendly, require a long learning curve and are bulky.

In the prior art, unsuccessful attempts to solve this problem were attempted namely: portable bar code hand scanning apparatuses, pencil/pen and paper manual inventory systems and bulky computer inventory systems. However, the problem was solved by the present invention because it is lightweight and portable as well as extremely user friendly which requires a very short learning curve.

Innovations within the prior art are rapidly being exploited in the field of inventory control systems.

The present invention went contrary to the teaching of the art which describes portable bar code hand scanning apparatuses, pencil/pen and paper manual inventory systems and bulky computer inventory systems.

The present invention solved a long felt need for a lightweight and portable as well as extremely user friendly inventory system which requires a very short learning curve.

The present invention produced unexpected results namely: consumers did not dispute damaged items since they were originally inventoried as damaged.

A synergistic effect was produced utilizing the present invention due to the following facts and results from experimentation: increase in sales as a result of the consumer having increase confidence in the simplified inventory control system.

Accordingly, it is an object of the present invention to provide an inventory control system.

More particularly, it is an object of the present invention to provide an inventory control system comprising a portable computer, a portable printer, and computer software having computer software inventory.

In keeping with these objects, and with others which will become apparent hereinafter, one feature of the present invention resides, briefly stated, in the portable computer comprises a portable computer CPU.

When the portable computer is designed in accordance with the present invention, it further comprises a portable computer storage means.

In accordance with another feature of the present invention, the portable computer further comprises a portable computer display having a portable computer display controller.

Another feature of the present invention is that the portable computer further comprises a portable computer power means.

Yet another feature of the present invention is that the portable computer further comprises a portable computer stylus having a portable computer stylus controller, a portable computer stylus button, and a portable computer stylus connector.

Still another feature of the present invention is that the portable computer further comprises a portable computer housing having portable computer housing indicia, a portable computer housing stylus holder, and a portable computer housing cover.

Yet still another feature of the present invention is that the portable printer comprises a portable printer paper inventory which comprises: portable printer paper sofa chair inventory, portable printer paper sofa inventory, portable printer paper wall unit inventory, portable printer paper dining room table chairs inventory, portable printer paper dining room table inventory, portable printer paper lawn mower inventory, portable printer paper refrigerator inventory, portable printer paper stove inventory, portable printer paper microwave inventory, portable printer paper washer inventory, portable printer paper dryer inventory, portable printer paper mattress inventory, portable printer paper box spring inventory, portable printer paper dresser inventory, portable printer paper armoire inventory, and portable printer paper other inventory.

Still yet another feature of the present invention is that the portable printer paper further comprises a plurality of portable printer paper check box having a portable printer paper check box "X" if the item is present.

Another feature of the present invention is that the portable printer paper further comprises a plurality of portable printer paper quantity each having a portable printer paper quantity UP arrow, a portable printer paper quantity DOWN arrow, and a portable printer paper quantity number.

Yet another feature of the present invention is that the portable printer paper further comprises a plurality of portable printer paper damage each having a portable printer paper YES damage and a portable printer paper NO damage.

Still another feature of the present invention is that portable printer paper further comprises a portable printer paper disclaimer having a portable printer paper pick up disclaimer with a portable printer paper pick up disclaimer signature line and a portable printer paper pick up disclaimer computer generated date and a portable printer paper deliver disclaimer with a portable printer paper deliver disclaimer signature line and a portable printer paper deliver disclaimer computer generated date.

Yet still another feature of the present invention is that the computer software comprises a computer software inventory which comprises: computer software sofa chair inventory, computer software sofa inventory, computer software wall unit inventory, computer software dining room table chairs inventory, computer software dining room table inventory, computer software lawn mower inventory, computer software refrigerator inventory, computer software stove inventory, computer software microwave inventory, computer software washer inventory, computer software dryer inventory, computer software mattress inventory, computer software box spring inventory, computer software dresser inventory, computer software armoire inventory, and computer software other inventory.

Still yet another feature of the present invention is that the computer software further comprises a plurality of computer software check boxes each having a computer software check box "X" if the item is present.

Another feature of the present invention is that computer the computer software further comprises a plurality of software quantity each corresponding to a computer software inventory, the computer software quantity each have a computer software quantity UP arrow, a computer software quantity DOWN arrow, and a computer software quantity number.

Yet another feature of the present invention is that the computer software further comprises a plurality of computer software damage which correspond to each computer software inventory. The computer software damage comprise a computer software YES damage and a computer software NO damage.

Still another feature of the present invention is that the computer software further comprises a computer software disclaimer having a computer software pick up declaimer which comprises a computer software pick up disclaimer signature line and a computer software pick up disclaimer computer generated date as well as a computer software deliver disclaimer which comprises a computer software deliver disclaimer signature line and a computer software deliver disclaimer computer generated date.

Yet still another feature of the present invention is that the computer software further comprises a computer software control which comprises a computer software line UP control and a computer software line DOWN control having a computer software line marker control therebetween.

Still yet another feature of the present invention is that computer software control further comprises a computer software page UP control, a computer software page DOWN control, a computer software ON/OFF control with corresponding computer software ON/OFF control indicator and a computer software print control.

The novel features which are considered characteristic for the invention are set forth in the appended claims. The invention itself however, both as to its construction and its method of operation, together with additional objects and advantages thereof will be best understood from the following description of the specific embodiments when read and understood in connection with the accompanying drawings.

DESCRIPTION OF THE PREFERRED EMBODIMENT

Figure 1B:
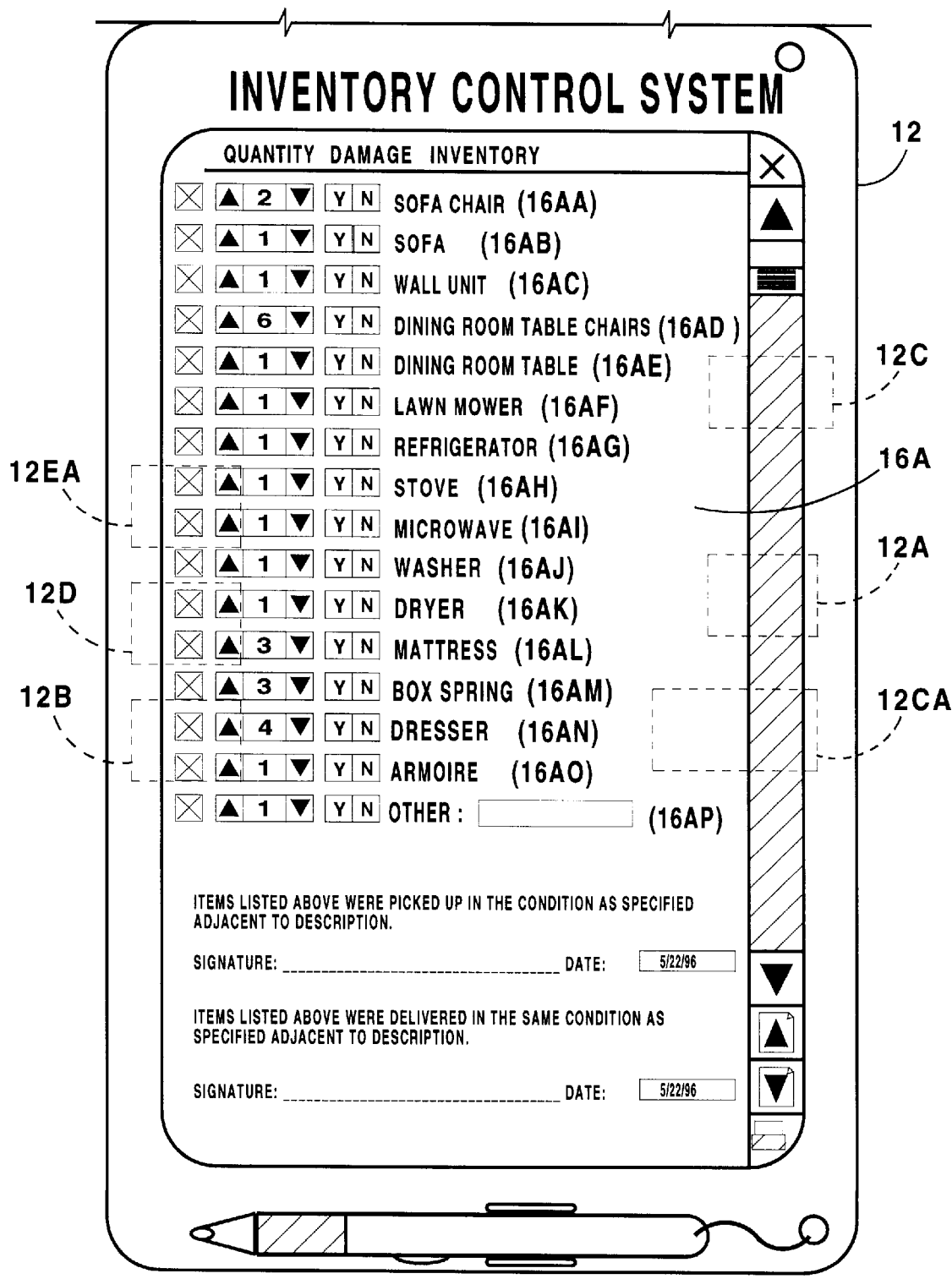
FIG. 1 is a top view of a inventory sheet control system exhibiting a portable computer and a portable printer having portable printer paper inventory extruding therefrom.
Figure 3:
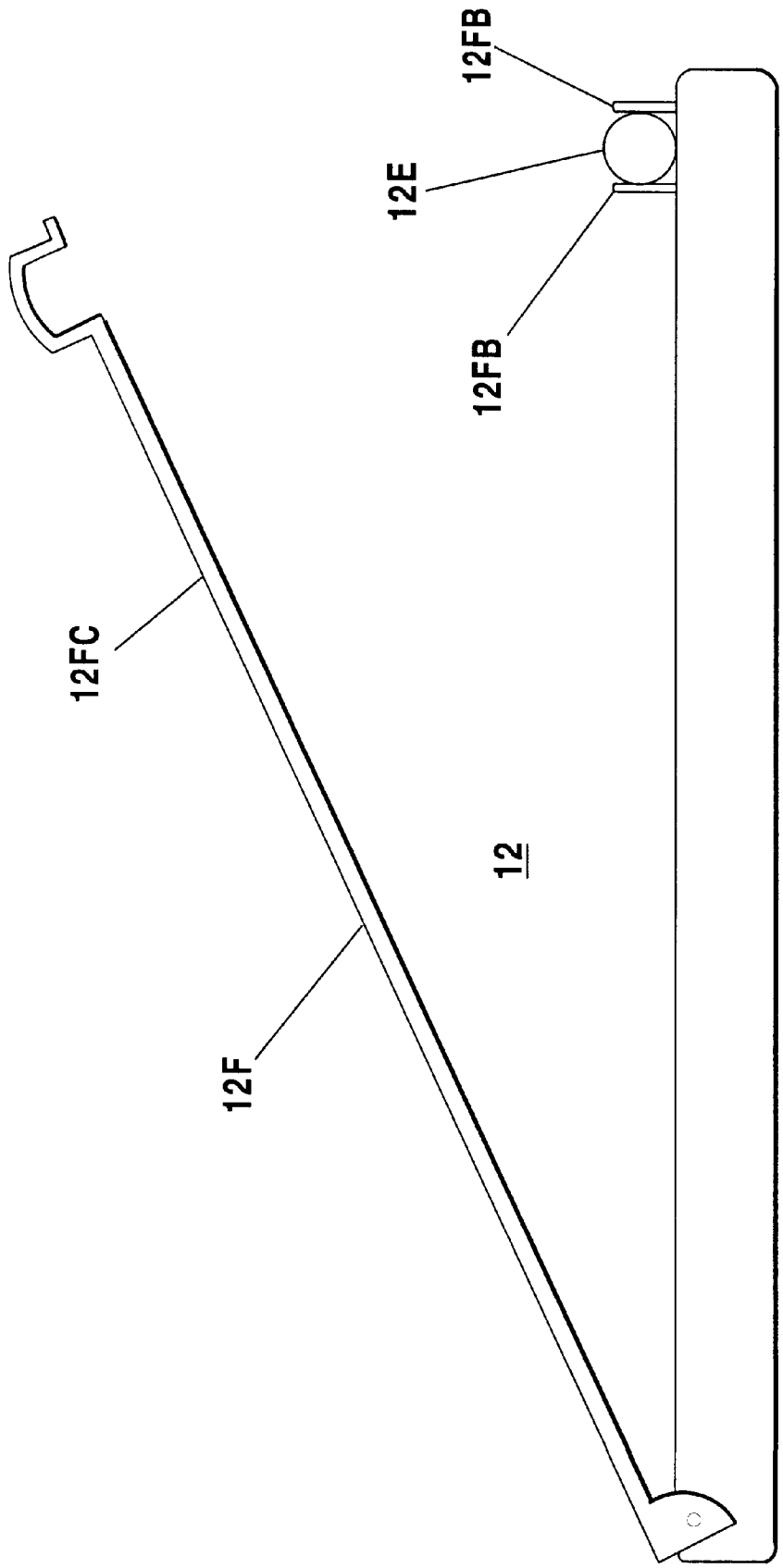
FIG. 3 is a side view of a portable computer exhibiting a portable computer housing cover.

Firstly, referring to FIG. 1 and FIG. 3 which is a top view and a side view, respectively, of a inventory control system 10 exhibiting a portable computer 12. FIG. 1 exhibits exhibiting a portable computer 12 electrically connected to a portable printer 14 having a portable printer paper inventory sheet 14A extruding therefrom FIG. 3 is a side view of a portable computer 12 exhibiting a portable computer housing cover 12FC. The portable computer 12 is electronically linked to the portable printer 14. The portable printer 14 prints, upon command by a user, a copy of the portable printer paper inventory sheet 14A is produced. The portable printer 14 is capable of producing a portable printer paper inventory 14A which is generated from the computer software and corresponds to the computer software inventory sheet 16A, for which portable printer paper inventory 14A has at least one item selected from a group consisting of portable printer paper sofa chair inventory 14AA, portable printer paper sofa inventory 14AB, portable printer paper wall unit inventory 14AC, portable printer paper dining room table chairs inventory 14AD, portable printer paper dining room table inventory 14AE, portable printer paper lawn mower inventory 14AF, portable printer paper refrigerator inventory 14AG, portable printer paper stove inventory 14AH, portable printer paper microwave inventory 14AI, portable printer paper washer inventory 14AJ, portable printer paper dryer inventory 14AK, portable printer paper mattress inventory 14AL, portable printer paper box spring inventory 14AM, portable printer paper dresser inventory 14AN, portable printer paper armoire inventory 14AO, portable printer paper other inventory 14AP, portable printer paper check box 14B, portable printer paper check box "X" 14BA, portable printer paper quantity 14C, portable printer paper quantity number 14CC, portable printer paper damage 14D, portable printer paper YES damage 14DA, portable printer paper NO damage 14DB and the remaining items shown on the computer display 16A. The portable computer 12 is contained within a portable computer housing 12F.

The portable computer 12 comprises a portable computer CPU 12A electrically connected to a portable computer power means 12D. The portable computer 12 further comprises a portable computer storage means 12C electrically connected to the portable computer CPU 12A. The portable computer 12 further comprises a portable computer display controller 12CA electrically connected to the portable computer CPU 12A. The portable computer display controller 12CA is further electrically connected to a portable computer display 12A. The portable computer 12 further comprises a portable computer stylus controller 12EA electrically connected to the portable computer CPU 12A. The portable computer stylus controller 12EA is further electrically connected via a portable computer stylus connector 12EC to a portable computer stylus 12E which has at least one portable computer stylus button 12EB functioning as a mouse function button.

A portable printer 14 is electrically connected to the portable computer CPU 12A and further electrically connected to the portable computer power means 12D. Computer software is contained within the portable computer 12. The computer software comprises computer software inventory display 16A having computer software inventory items.

The portable computer housing 12F comprises portable computer housing indicia 12FA thereon. The portable computer housing 12F further comprises a portable computer housing stylus holder 12FB securely mounted thereon. The portable computer housing 12F further comprises a portable computer housing cover 12FC removably mounted thereon.

Figure 2:
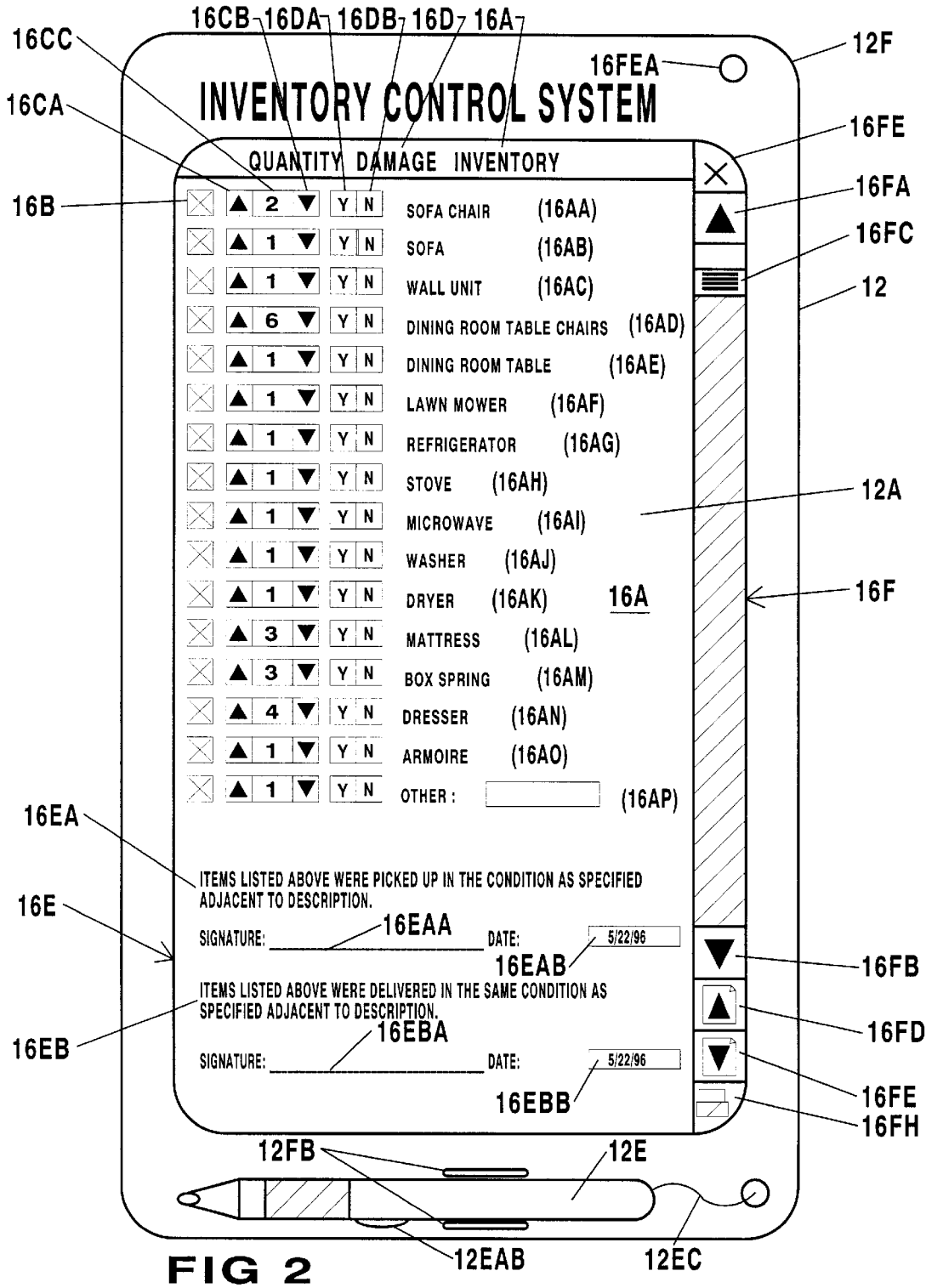
FIG. 2 is an enlarged view of a portable computer display of a portable computer.

Now referring to FIG. 2 which is an enlarged view of a portable computer display 12C of a portable computer 12. The portable computer display 12C exhibits computer software inventory 16A selected from a group consisting of computer software sofa chair inventory 16AA, computer software sofa inventory 16AB, computer software wall unit inventory 16AC, computer software dining room table chairs inventory 16AD, computer software dining room table inventory 16AE, computer software lawn mower inventory 16AF, computer software refrigerator inventory 16AG, computer software stove inventory 16AH, computer software microwave inventory 16AI, computer software washer inventory 16AJ, computer software dryer inventory 16AK, computer software mattress inventory 16AL, computer software box spring inventory 16AM, computer software dresser inventory 16AN, computer software armoire inventory 16AO, and computer software other inventory 16AP. The computer software 16 further comprises a separate computer software check box 16B corresponding to each computer software inventory item. The computer software check box 16B is positioned adjacent to and correlating with each computer software inventory item. When an software inventory item is present a user places a portable computer stylus 12E on the computer software check box 16B and clicks the portable computer stylus button 12EB which places a computer software check box "X" 16BA within the computer software check box 16B.

The computer software 16 further comprises a separate computer software quantity 16C corresponding to each computer software inventory item. The computer software quantity 16C is positioned adjacent to and correlating with each computer software inventory item Each computer software quantity 16C comprises a computer software quantity UP arrow 16CA and a computer software quantity DOWN arrow 16CB which are used in conjunction to produce a computer software quantity number 16CC. When a user desires to chose a quantity of inventory items, he/she places the portable computer stylus 12E on either the computer software quantity UP arrow 16CA or the computer software quantity DOWN arrow 16CB and clicks on the portable computer stylus button 12EB which correspondingly increases or decreases the computer software quantity 16C, respectively.

The computer software 16 further comprises a separate computer software damage 16D corresponding to each computer software inventory item. The computer software damage 16D is positioned adjacent to and correlating with each computer software inventory item Each computer software damage 16D comprises computer software YES damage 16DA and a computer software NO damage 16DB. When a user desires to indicate that a particular inventory item is damaged, he/she places the portable computer stylus 12E on either the computer software YES damage (16DA) or the computer software NO damage 16DB and clicks on the portable computer stylus button 12EB which correspondingly marks either the computer software YES damage 16DA or the computer software NO damage 16DB.

The computer software 16 further comprises a computer software disclaimer 16E which comprises a computer software pick up disclaimer 16EA having a computer software pick up disclaimer signature line 16EAA and a computer software pick up disclaimer computer generated date 16EAB. After initial inventory is completed prior to shipping, the owner or person responsible for the owner of the inventory items checks all items and signs on the computer software pick up disclaimer signature line 16EAA. The computer software disclaimer 16E further comprises a computer software deliver disclaimer 16EB having a computer software deliver disclaimer signature line 16EBA and a computer software deliver disclaimer computer generated date 16EBB. After delivery completed, the owner or person responsible for the owner of the inventory items checks all items and signs on the computer software deliver disclaimer signature line 16EBA thereby releasing all claims to the delivered items.

The computer software 16 further comprises a computer software control 16F which comprises computer software ON/OFF control 16FG and a computer software print control 16FH. The computer software ON/OFF control 16FG turns the portable computer 12 ON and OFF by placing the portable computer stylus 12E thereon and clicking the portable computer stylus button 12EB. The computer software ON/OFF control 16FG comprises a computer software ON/OFF control indicator 16FGA electrically connected to the portable computer CPU 12A and contained within the portable computer housing 12F. T, the computer software ON/OFF control indicator 16FGA shows a user if the portable computer 12 is functioning.

The computer software control 16F comprises a computer software line UP control 16FA and a computer software line DOWN control 16FB. The computer software line UP control 16FA and a computer software line DOWN control 16FB functions by placing the portable computer stylus 12E thereon and clicking the portable computer stylus button 12EB thereby moving the computer software inventory 16A presented on the portable computer display 12C in a corresponding line by line upward or downward direction. The computer software control 16F further comprises a computer software line marker control 16FC, functioning to mark the line that a cursor is on, is positioned between the computer software line UP control 16FA and the computer software line DOWN control 16FB. The computer software control 16F a computer software page UP control 16FD and a computer software page DOWN control 16FE functioning by placing the portable computer stylus 12E thereon and clicking the portable computer stylus button 12EB thereby moving the computer software inventory 16A presented on the portable computer display 12C in a corresponding line by line upward or downward direction.

The computer software inventory 16A is selected from a group consisting of computer software sofa chair inventory 16AA, computer software sofa inventory 16AB, computer software wall unit inventory 16AC, computer software dining room table chairs inventory 16AD, computer software dining room table inventory 16AE, computer software lawn mower inventory 16AF, computer software refrigerator inventory 16AG, computer software stove inventory 16AH, computer software microwave inventory 16AI, computer software washer inventory 16AJ, computer software dryer inventory 16AK, computer software mattress inventory 16AL, computer software box spring inventory 16AM, computer software dresser inventory 16AN, computer software armoire inventory 16AO, and computer software other inventory 16AP.

It will be understood that each of the elements described above, or two or more together, may also find a useful application in other types of constructions differing from the type described above.

While the invention has been illustrated and described as embodied in an inventory control system, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. An inventory control system for use in moving household furnishings comprising:
   a) a portable computer having a fixed pre-existing display of a listing of articles of furnishings including for each article, means for entering information relating to damage, quantity of the article, and other information with regard to the articles being moved;
   b) said display also including means for entering information with regard to pick up and delivery of said articles;
   c) stylus means attached to said portable computer for engaging said means for entering information for entering said information about said articles; and
   d) a printer attached to said portable computer for printing out on command on a sheet a copy of the display on said portable computer with the information about said articles entered thereon.

2. The inventory control system of claim 1 in which said portable computer comprises a rectangular shaped housing with said display a front side, said stylus means comprising a pen-like member connected by a cord at one end to said housing and a clip mounted on said front side along one edge of said housing for holding said pen-like member when not in use, a cover for said front side being pivoted along an edge of said housing opposite that of said clip, and said cover having a U-shape at the distal end thereof for enclosing said clip with pen-like member when said portable computer is not in use and said cover is closed.

3. The method of tracking household furnishings during a move comprising the steps of:
   a) making an inventory of the articles being moved by using a stylus to enter into a portable computer having a fixed pre-existing display of a list of usual articles of household furnishings the information for each of said articles relating to damage, quantity of the article, and other information, said portable computer having said stylus removably mounted on the front of said computer and a pivoted cover to enclose said portable computer and stylus when not in use;
   b) entering information with regard to pick up and delivery of said articles; and
   c) using a printer attached to said portable computer for printing out on command on a sheet said inventory being a copy of the display on said portable computer with the information about said articles entered thereon.

\* \* \* \* \*